United States Patent
Fischer et al.

(10) Patent No.: US 6,940,467 B2
(45) Date of Patent: Sep. 6, 2005

(54) CIRCUIT ARRANGEMENT AND METHOD FOR DERIVING ELECTRICAL POWER FROM AN ELECTROMAGNETIC FIELD

(75) Inventors: Martin Fischer, Gleichen (DE); Ulrich Friedrich, Ellhofen (DE); Udo Karthaus, Ulm (DE)

(73) Assignee: Atmel Germany GmbH, Heilbronn (DE)

( * ) Notice: Subject to any disclaimer, the term of this patent is extended or adjusted under 35 U.S.C. 154(b) by 71 days.

(21) Appl. No.: 10/753,849

(22) Filed: Jan. 7, 2004

(65) Prior Publication Data

US 2004/0155754 A1 Aug. 12, 2004

(30) Foreign Application Priority Data

Jan. 10, 2003 (DE) .......................... 103 01 452
Dec. 4, 2003 (DE) .......................... 103 57 665

(51) Int. Cl.[7] .............. H01Q 1/50; H04Q 5/22
(52) U.S. Cl. ............ 343/850; 343/860; 340/10.1; 340/572.7
(58) Field of Search ............... 343/850, 860; 340/10.1, 10.33, 10.34, 572.7, 572.1

(56) References Cited

U.S. PATENT DOCUMENTS

| | | | | |
|---|---|---|---|---|
| 5,136,719 A | * | 8/1992 | Gaskill et al. ........... 455/193.1 |
| 5,218,343 A | | 6/1993 | Stobbe et al. ............. 340/572 |
| 5,258,728 A | * | 11/1993 | Taniyoshi et al. ........... 333/132 |
| 5,604,507 A | * | 2/1997 | Openlander ................ 343/860 |
| 5,731,691 A | | 3/1998 | Noto ........................ 343/220 |
| 5,889,489 A | | 3/1999 | Friedman ..................... 342/51 |
| 5,942,977 A | * | 8/1999 | Palmer et al. ........... 340/572.5 |
| 6,054,925 A | * | 4/2000 | Proctor et al. ........... 340/572.7 |
| 6,606,069 B2 | * | 8/2003 | Kitamura et al. ........... 343/745 |
| 6,608,603 B2 | * | 8/2003 | Alexopoulos et al. ...... 343/860 |
| 6,621,467 B1 | * | 9/2003 | Marsh ........................ 343/850 |
| 6,650,226 B1 | | 11/2003 | Wuidart et al. ............ 340/10.1 |
| 6,703,921 B1 | | 3/2004 | Wuidart et al. ............ 340/10.4 |
| 6,731,198 B1 | | 5/2004 | Stobbe et al. ............ 340/10.33 |
| 2003/0102961 A1 | | 6/2003 | Fischer et al. ............ 340/10.1 |
| 2004/0145452 A1 | | 7/2004 | Fischer et al. ............ 340/10.1 |
| 2004/0257293 A1 | * | 12/2004 | Friedrich et al. ........... 343/860 |

FOREIGN PATENT DOCUMENTS

| | | |
|---|---|---|
| DE | 196 29 291 | 1/1997 |
| DE | 196 14 455 | 10/1997 |
| DE | 196 53 841 | 6/1998 |
| EP | 0829940 | 3/1998 |
| EP | 1018692 | 7/2000 |
| EP | 1026832 | 8/2000 |
| EP | 1045336 | 10/2000 |
| EP | 1083519 | 3/2001 |
| EP | 1211635 | 6/2002 |
| EP | 1326202 | 7/2003 |
| FR | 2782209 | 2/2000 |
| GB | 2224182 | 4/1990 |
| GB | 2321726 | 8/1998 |

* cited by examiner

Primary Examiner—Tan Ho
(74) Attorney, Agent, or Firm—W. F. Fasse; W. G. Fasse

(57) ABSTRACT

A circuit arrangement for deriving electrical power from a received electromagnetic field to power a transponder includes a detuning unit connected between two antenna terminals for limiting the power absorbed by the antenna. The detuning unit includes a component having an impedance that passively varies or is actively varied dependent on the field strength of the field prevailing at the antenna. One arrangement of the detuning unit includes two varactor diodes connected anti-parallel between the antenna terminals. Another arrangement of the detuning unit includes a varactor arranged in series between two capacitors between the antenna terminals, a field strength detector, and a controllable voltage source connected to apply to the varactor a control voltage that varies depending on the detected field strength. Thereby, the input impedance varies depending on the field strength, to achieve impedance matching for a low field strength, and a mis-matched condition for a high field strength.

26 Claims, 2 Drawing Sheets

CIRCUIT ARRANGEMENT AND METHOD FOR DERIVING ELECTRICAL POWER FROM AN ELECTROMAGNETIC FIELD

PRIORITY CLAIM

This application is based on and claims the priorities under 35 U.S.C. §119 of German Patent Applications 103 01 452.7 filed on Jan. 10, 2003 and 103 57 665.7 filed on Dec. 4, 2003, the entire disclosures of which are incorporated herein by reference.

FIELD OF THE INVENTION

The invention relates to a circuit arrangement and a method for deriving or extracting electrical power from a high frequency electromagnetic field, especially such a field that has been emitted by a base station and received by a transponder that modulates and backscatters or reflects the received electromagnetic waves. The transponder may especially be a passive transponder operating only on the electrical power derived from the received field.

BACKGROUND INFORMATION

Circuit arrangements of the above mentioned general type are used, for example, in transponders for wireless or contactless identification systems such as RFID systems (radio frequency identification systems) and in remote sensors. In this context, the power derived from the electromagnetic field operates the transponder or remote sensor in order to transmit, or especially backscatter, identification information or sensor information in a contactless manner from the transponder or sensor to the base station or reader station. Throughout this specification, the general term "transponder" should be understood to cover both passive and semi-passive transponders, as well as remote sensors that include sensor elements in or connected to a transponder. The term "receiving/backscattering device or arrangement" refers to any device that receives and backscatters an electromagnetic wave signal, and includes transponders, remote sensors, and the like.

Such transponders, or particularly the receiving/backscattering or receiving/transmitting circuit arrangements thereof, typically do not include an active transmitter for actively transmitting the relevant data to the base station. Instead, the transponders are non-active systems that can be designated as passive systems if they do not comprise their own power supply, or as semi-passive systems if they do comprise their own power supply. In such non-active systems, the data transmission in the distant field of the base station in connection with UHF waves or microwaves generally uses a so-called backscattering or backscatter-coupling between the receiving/backscattering arrangement (i.e. transponder) and the base station. While such non-active transponders are sometimes also called receiver/transmitters or receiving/transmitting arrangements, this application uses the term "receiving/backscattering arrangement", because this arrangement does not actively transmit but rather merely reflects or backscatters the modulated received electromagnetic waves.

In this regard, the base station emits electromagnetic waves, which are received by the transponder, and then modulated by the transponder in accordance with the particular data that are to be transmitted back to the base station. The thusly modulated signal or electromagnetic waves are reflected or backscattered with the modulation back to the base station. This modulated reflection or backscattering is generally achieved using an input impedance variation of the receiving/backscattering arrangement, which causes a corresponding variation of the reflection characteristics of an antenna connected thereto. Thereby the reflected or backscattered signal is correspondingly modulated, so that the base station can receive and evaluate the modulated backscattered signal so as to recover the data represented by the modulation.

The demands on the transmission range of transponders and particularly passive transponders are continuously increasing in various technical fields or applications. In order to achieve relatively large transmission ranges of passive transponders, the antenna or the circuitry connected to the antenna of the transponder must, respectively, be suitably designed and particularly dimensioned in a matched manner. Also, a rectifier included in the transponder, which receives and rectifies the alternating voltage signal that was received by the antenna to provide the operating power, must be able to convert even the smallest voltages of the input signal into a sufficient operating voltage at the output side of the rectifier. The corresponding high sensitivity of the rectifier that is required in this regard may, however, lead to destruction of the rectifier itself or other circuit components when the transponder operates in the near field or close range of the base station, due to the higher field strength of the emitted electromagnetic field prevailing there. Namely, the higher received field strength may, for example, cause the rectifier to generate an output voltage that is too high, so that it must necessarily be limited by a voltage regulator. Depending on the particular design or embodiment of the voltage regulator, this can lead to an increased current flow in the rectifier, which may cause the generated or dissipated power to exceed the maximum permissible power and thereby may destroy the rectifier or other circuit components.

In order to limit the power that is received and extracted from the electromagnetic field via the antenna into the circuit arrangement, particularly in the near field or close range of the emitting base station where the field strength is high, a so-called detuning of the input circuit connected to the antenna may be carried out. This purposeful impedance mis-matching of the input circuit causes an increase of the reflected power proportion and a corresponding decrease of the absorbed power proportion.

In conventional systems, such detuning is carried out by means of a detuning unit that uses a modulator performing an amplitude shift keying (ASK) in order to vary the real part of the input impedance of the input circuit or circuit portion connected to the antenna so as to detune or mismatch the input impedance. For this purpose, the ASK modulator is arranged in the circuit input portion or as an additional load resistor at the output of the rectifier. Such a circuit arrangement is known, for example as described in the published European Patent Application EP 1 211 635 A2.

Such a known detuning by means of ASK modulation, however, requires a high or large real part of the input impedance in comparison to the imaginary part thereof. In this context, the ASK modulator is controlled or actuated not only by the ASK modulation control signal but also by a regulator arranged in the detuning unit, which achieves a suitable mis-matching or detuning through an operating point adjustment of the ASK modulator dependent on the power being supplied or fed-in through the antenna.

In view of the above, problems or difficulties arise if such a detuning is to be used in connection with a phase shift keying (PSK) modulation for carrying out the data transmission between the transponder and the base station. Namely, for such a PSK modulation, a smaller real part in comparison to the imaginary part is required for the input impedance. Thus, in order to adjust the detuning or mismatch by varying the real part, it becomes necessary to provide a low resistance path in the input portion of the circuit or at the output of the rectifier through an arrangement of an additional switching device, for example a transistor. Such low resistance switching devices generally comprise relatively large parasitics, which lead to corresponding losses in normal operation, whereby the transmission range of the transponder is correspondingly reduced. For this reason, it is generally not possible to combine a PSK modulator for carrying out a PSK modulation for the data transmission, with a detuning unit based on varying the real part of the input impedance, i.e. based on an ASK modulation.

From the German Patent Laying-Open Publication DE 196 29 291 A1, it is known to arrange two anti-parallel diodes in an input circuit of a transponder for providing electrostatic discharge (ESD) protection. In this context, the diodes become conductive when, for example due to an ESD interference, an unusually high and interfering input voltage exceeds a diode threshold voltage of the diodes. A field strength dependent power adaptation is not provided with such an ESD protection circuit.

SUMMARY OF THE INVENTION

In view of the above, it is an object of the invention to provide a circuit arrangement and a method for deriving or extracting electrical power from a received electromagnetic field, e.g. the electromagnetic field emitted by a base station, so as to reliably provide a sufficient voltage supply even in the far field region of the electromagnetic field, yet limit the power take-up in the near field or close range of the electromagnetic field, so as to prevent destruction, damage or failure of circuit components due to excessive power or voltage. A further, more particular object of the invention is to adjust or vary the power take-up from the received field depending on the field strength prevailing at the antenna. The invention further aims to avoid or overcome the disadvantages of the prior art, and to achieve additional advantages, as apparent from the present specification. The attainment of these objects is, however, not a required limitation of the invention.

The above objects have been achieved according to the invention in a circuit arrangement for deriving electrical power from a high frequency electromagnetic field that is emitted by a base station and received by a transponder which is to reflect or backscatter the received field. The circuit arrangement includes an antenna with two connection poles or terminals, and a detuning unit for limiting the power that is absorbed or taken-up from the electromagnetic field via the antenna, whereby this detuning unit is connected in circuit between the two terminals or poles of the antenna. Particularly according to the invention, the detuning unit comprises a circuit component that has a variable impedance that varies (or is varied) depending on the field strength of the electromagnetic field prevailing at the antenna.

The above objects have further been achieved according to the invention in a method of deriving electrical power from a received high frequency electromagnetic field, which method may be carried out with the inventive circuit arrangement. The method involves varying the impedance, and particularly predominantly the imaginary part of the input impedance, of at least one circuit component of the detuning unit depending on the field strength of the electromagnetic field prevailing at the antenna. This consequently allows the degree of tuning or impedance matching of the input circuit and the antenna to be adjusted or varied, so that a sufficient amount of power can still be absorbed (by using a high degree of matching) when the field strength is low, while avoiding excessive power absorption (by using a low degree of matching, or thus mis-matching) when the field strength is high.

As mentioned above, the detuning unit of the inventive circuit arrangement includes a circuit component of which the impedance varies (or is varied) dependent on the field strength of the electromagnetic field prevailing at the antenna. Thereby it becomes possible, for example, to adjust and select the impedance of the circuit component at low or medium field strengths of the electromagnetic field (e.g. in the far field region), so as to adjust or set a resulting input impedance of the transponder at its antenna connections or terminals, which enables a power-adapted or matched operation. In other words, at such low and medium field strengths, the input impedance is matched to a sufficient degree to achieve a sufficiently high coupling of the electromagnetic field via the antenna into the circuit arrangement, to provide a sufficient received power level. In the far field region of the base station, the field strength variations of the electromagnetic field, and thus also the impedance variations of the circuit component of the detuning unit, are comparatively small, so that an approximately power matched or tuned condition of the antenna and input circuit of the transponder pertains in essentially the entire far field region of the electromagnetic field.

On the other hand, when the field strength of the electromagnetic field prevailing at the antenna sharply increases in the near field region of the base station, then the impedance of the pertinent circuit component of the transponder will vary sharply, whereby the resulting input impedance of the circuit portion of the transponder connected to the antenna will similarly be sharply varied. Particularly, this achieves a relatively strong mis-matching of the antenna, and consequently a sharp reduction of the power coupled out of the electromagnetic field via the antenna into the input circuit portion of the transponder. Thereby, an excessive power delivery to connected circuit components, such as a rectifier, is prevented. In contrast, as explained above, when operating in the far field region with a relatively low field strength, the antenna is operated in a matched or tuned manner so that the maximum power derivable from the prevailing electromagnetic field is made available for the connected circuit components.

Such a realization of the detuning is able to achieve a sharp variation of both the real part and the imaginary part of the input impedance dependent on the input power. Therefore, the inventive detuning achieves a considerably more effective power reduction in connection with an increasing available input power (corresponding to an increasing field strength), in comparison to an ASK based detuning unit. Particularly, this is because the invention involves changing or altering both the real part as well as the imaginary part (and especially predominantly the imaginary part) of the input impedance, in contrast to the ASK based detuning unit which varies essentially only the real part of the impedance. The invention thus allows the modulator or the load resistor used for the ASK process to be omitted, and the related disadvantages thereof to be avoided, namely that the parasitic characteristics of the ASK modulator or load resistance, when arranged in the input portion, have a negative influence on the effectiveness of the input portion, and when arranged at the output of a rectifier, cause an impairment of the far field characteristics. Furthermore, a regulator for activating and controlling the ASK modulator, for setting a suitable mis-match or detuning dependent on the power being supplied or fed-in, is similarly not necessary in the inventive circuit arrangement. Overall, these features of the invention lead to a simplified design, a reduction of the required chip surface area, reduced costs, and significantly increased operational security and reliability.

According to a further preferred detail of the circuit arrangement according to the invention, the frequency of the relevant electromagnetic field is in a range from 300 MHz to 3000 MHz, and especially in the range from 400 MHz to 2450 MHz. In this frequency range, there are conventional circuit components available, which have or enable a sufficient impedance variation dependent on the field strength, to be used in the detuning unit of the inventive circuit arrangement.

Further according to the invention, the variation of the impedance of the circuit component of the detuning unit is essentially achieved by altering or varying the imaginary part of the impedance.

In a further embodiment of the circuit arrangement according to the invention, the circuit component of the detuning unit is a varactor, especially a varactor or varactor diode with a high quality factor. This is advantageous because varactors are relatively simple to realize and to integrate into circuit arrangements, and inherently have a voltage-dependent capacitance. Thus, such a varactor, if properly arranged and dimensioned, can "automatically" (without any additional active control device) provide the required inventive variation of the impedance responsive to and dependent on the input voltage, which relates to the field strength coupled into the input circuit. Alternatively, the varactor can be actively controlled to vary the impedance by applying thereto a control voltage that depends on the field strength of the electromagnetic field prevailing at the antenna. Due to the high quality factor, i.e. a relatively low ohmic resistive component of the impedance, the power dissipation caused by the circuit component is minimized.

In a further embodiment according to the invention, the detuning unit comprises two varactor diodes, which especially have a high quality factor, and which are connected anti-parallel to each other between the two antenna terminals. With such a circuit connection of varactor diodes, not only the inventive detuning but also an electrostatic discharge (ESD) protection is achieved. Also, the detuning can be achieved "automatically" without requiring further active control, as described above.

A further feature of the invention provides that the detuning unit additionally comprises varactor control means that are adapted to control the varactor or varactors in a field strength dependent manner. In a particular advantageous embodiment, the detuning unit may comprise a first capacitor, a varactor, and a second capacitor that are connected in series between the two connection poles or terminals of the antenna. The varactor control means are connected and adapted to apply a field strength dependent control voltage to the varactor or varactors.

In a further embodiment of the circuit arrangement according to the invention, a rectifier is connected to the terminals of the antenna, and a voltage limiter circuit is coupled to the output of the rectifier. This voltage limiter circuit may, for example, be in the form of plural diodes connected in series. This voltage limiter circuit provides an additional protection against excessive voltages being produced at the output of the rectifier, and achieves an increased operating security and reliability, and an increased protection against destruction or damage of the circuit components.

Another feature of the invention is that the circuit arrangement is preferably integrated into a transponder. Advantageously, the transponder is a passive transponder, i.e. does not include its own internal energy or power supply and operates entirely on the power derived from the received electromagnetic field.

Furthermore, the transponder may comprise a modulation arrangement for carrying out a data transmission. In this context, the modulation arrangement modulates the electromagnetic waves received by the antenna, whereby the modulation is dependent on or in accordance with the data that are to be transmitted. Advantageously, the modulation arrangement may be embodied and adapted for carrying out a phase shift keying (PSK) modulation. In PSK modulation, the real part of the input impedance is substantially smaller than in amplitude shift keying (ASK). Thus, a conventional detuning through regulation of the operating point of an ASK modulator as in an ASK modulation is not directly or simply possible in this context. Of course, the inventive circuit arrangement can also be combined with conventional ASK modulators.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF PREFERRED EXAMPLE EMBODIMENTS AND THE BEST MODE OF THE INVENTION

Figure 1:
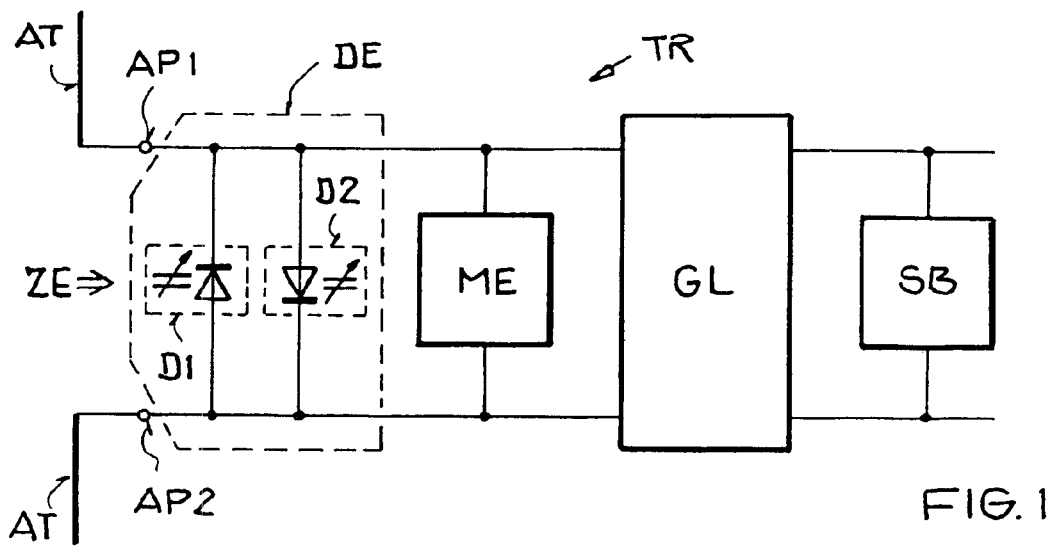
FIG. 1 is a schematic block circuit diagram of a circuit arrangement for deriving electrical power from an electromagnetic field, integrated in a passive transponder according to the invention.

The schematic block circuit diagram of FIG. 1 shows a circuit arrangement for deriving electrical power from a received electromagnetic field, whereby this circuit arrangement is integrated into a passive transponder TR. The overall or other circuitry of the transponder TR (not shown in detail) may be according to any conventionally known circuit arrangements of passive transponders, remote sensors, or the like.

The illustrated embodiment of the inventive circuit arrangement comprises an antenna AT having two connection poles or terminals AP1 and AP2, a detuning unit DE, a modulation arrangement or modulator ME, a rectifier GL, and a voltage limiter SB. The detuning unit DE, the modulator ME and the rectifier GL are each directly connected in succession to the two antenna terminals AP1 and AP2. Being "directly" connected means connected with only conductors therebetween and without any other circuit components interposed therebetween. The voltage limiter SB is connected to the two outputs of the rectifier GL. The detuning unit DE comprises two varactor diodes D1 and D2 having a high quality factor and identical characteristics, whereby these two varactor diodes D1 and D2 are connected anti-parallel, i.e. parallel to each other in opposite forward conduction directions, between the two antenna terminals AP1 and AP2.

In order to supply the required operating power of the passive transponder TR, the antenna AT absorbs or takes up power from a received electromagnetic filed, which is emitted and radiated from a base station that is not shown. The local field strength and therewith the available power of the electromagnetic field varies and particularly falls off as the distance from the base station increases. To avoid undesirable influences of such a variation of the available power of the electromagnetic field, the invention provides a varying degree of input impedance matching of the circuit arrangement relative to the antenna, dependent on the local prevailing field strength, so as to vary the degree of power coupling from the electromagnetic field via the antenna into the circuit, as follows.

In order to derive sufficient operating power for the transponder TR from the electromagnetic field in the far field region (i.e. at a relatively large distance from the base station), the input impedance ZE of the transponder TR between the two connection terminals AP1, AP2 of the antenna AT is selected so that a power matching, i.e. an impedance matching, is achieved for operating in this far field region. The requirements for such an impedance matched condition are that the imaginary part of the antenna impedance has an absolute value equal to that of the imaginary part of the input impedance ZE of the transponder, and that the real part of the antenna impedance is equal to the real part of the input impedance ZE of the transponder. In this regard, the varactor diodes D1 and D2 of the detuning unit DE are dimensioned so that the corresponding proper matched input impedance ZE arises for operation in the far field region, i.e. in the range of input voltages prevailing at the antenna terminals AP1 and AP2 when operating in the far field region. In this regard, the voltage-dependent capacitance of the varactor diodes D1 and D2 will "automatically" vary dependent on and responsive to the applied input voltage on the antenna terminals AP1 and AP2, which will thus correspondingly vary the imaginary part of the overall input impedance ZE. It is simply necessary to select the varactor diodes D1 and D2 having the proper impedance versus voltage characteristic for the desired operating range of the transponder TR.

In the illustrated embodiment, the two varactor diodes D1 and D2 are connected in an anti-parallel circuit configuration directly between the two connection poles or terminals AP1 and AP2 of the antenna AT. Alternatively, however, the varactor diodes D1 and D2 could be circuit-connected or looped-in at a different location of the antenna input circuit.

In comparison to the above described power-matched operation in the far field region, the inventive circuit will provide a detuned operation with a mis-matched input impedance ZE in the near field of the base station, in which the field strength of the electromagnetic field prevailing at the antenna strongly increases. Particularly, in the near field in which the electromagnetic field has a high and strongly increasing field strength, the capacitance and therewith the imaginary part of the impedance of the varactor diodes D1 and D2 is sharply or strongly altered (responsive to and dependent on the applied input voltage which relates to the prevailing field strength), whereby especially the imaginary part of the input impedance ZE of the transponder TR is correspondingly strongly altered. This leads to a detuning or mis-matching of the antenna relative to the input circuit, which thereby causes a reduction of the power absorbed or taken-up by the antenna from the electromagnetic field and coupled into the transponder TR. In other words, in the detuned condition with a mis-matched impedance, the proportion of the power of the electromagnetic field absorbed and taken-up by the antenna is reduced. These above described effects relating to the impedance variation are based on the high frequency characteristics of the varactor diodes D1 and D2, which, in the relevant utilized frequency range, no longer act as conventional diodes that become conductive above a certain threshold voltage.

The varactor diodes D1 and D2 simultaneously also serve to provide an electrostatic discharge (ESD) protection for conducting away or shorting out interfering voltage peaks caused by ESD. On the other hand, the varactor diodes D1 and D2 do not become conductive with the normal voltages arising in the input circuit during normal interference-free operation thereof. In order to optimize the ESD interference protection security and reliability, a symmetrical layout of the varactor diodes D1 and D2 should be provided.

Figure 2:
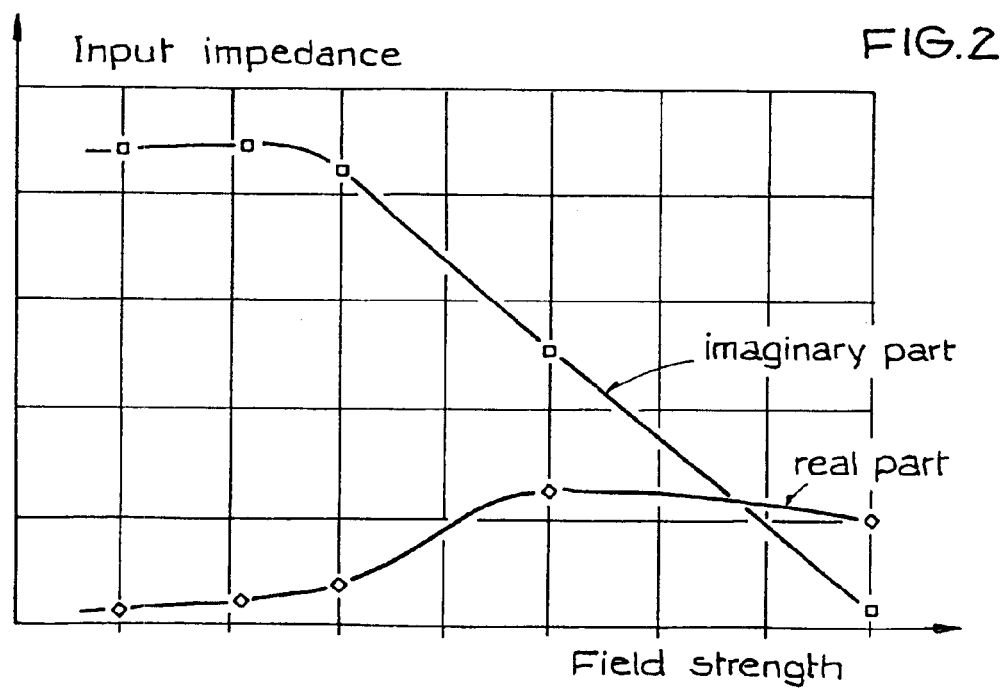
FIG. 2 is a graphical diagram of the real part and the imaginary part of the input impedance of the circuit arrangement according to FIG. 1 dependent on or as a function of the input power.

FIG. 2 shows a graphical diagram of the variation of the real part and the imaginary part of the input impedance ZE of the circuit arrangement of FIG. 1 dependent on the local field strength of the electromagnetic field at the location of the antenna. This variation of the input impedance ZE, and especially the imaginary part thereof, is largely influenced or determined by the varying voltage-dependent capacitance of the varactor diodes D1 and D2 as discussed above. As can be seen in the diagram, the imaginary part of the input impedance falls off or reduces sharply when the field strength exceeds a certain threshold field strength, while the real part increases somewhat above the threshold field strength and then remains substantially constant for further increases of the field strength.

Such a variation or change of the real part and the imaginary part of the input impedance ZE as represented in FIG. 2 achieves a considerably more effective detuning and consequent power reduction for increasing field strength in comparison to an ASK-based detuning unit. This is especially true because both the real part and the imaginary part of the input impedance vary in this context, whereby the imaginary part varies strongly and consistently over a range of field strengths, in comparison to conventional detuning units that rely on only the variation of the real part of the input impedance. The change or variation of the imaginary part is, however, essentially determinative for the detuning or mis-matching of the impedance, because the imaginary part changes considerably more strongly in comparison to the real part.

Referring again to FIG. 1, the modulation arrangement or modulator ME is connected downstream of the detuning unit DE between the connection poles or terminals AP1 and AP2 of the antenna AT. The modulator ME modulates the input signal to form a phase modulated output signal, which is emitted and particularly reflected or backscattered as a backscatter signal from the antenna AT to be received by the base station. In this regard, the modulation depends on and is in accordance with the data to be transmitted from the transponder TR to the base station (e.g. identification data, sensor data, etc.).

The rectifier GL is connected further downstream from the modulator ME between the antenna connection poles or terminals AP1 and AP2, and serves to provide the supply voltage for the transponder. Namely, the received signal voltage at the input side of the rectifier GL is rectified to provide a rectified output voltage on the output side of the rectifier GL, which is limited by the voltage limiter SB connected thereto. In this regard, the voltage limiter SB can be embodied as a series circuit of diodes between the two output terminals of the rectifier GL, or any other conventionally known voltage limiter circuit arrangement.

Figure 3:
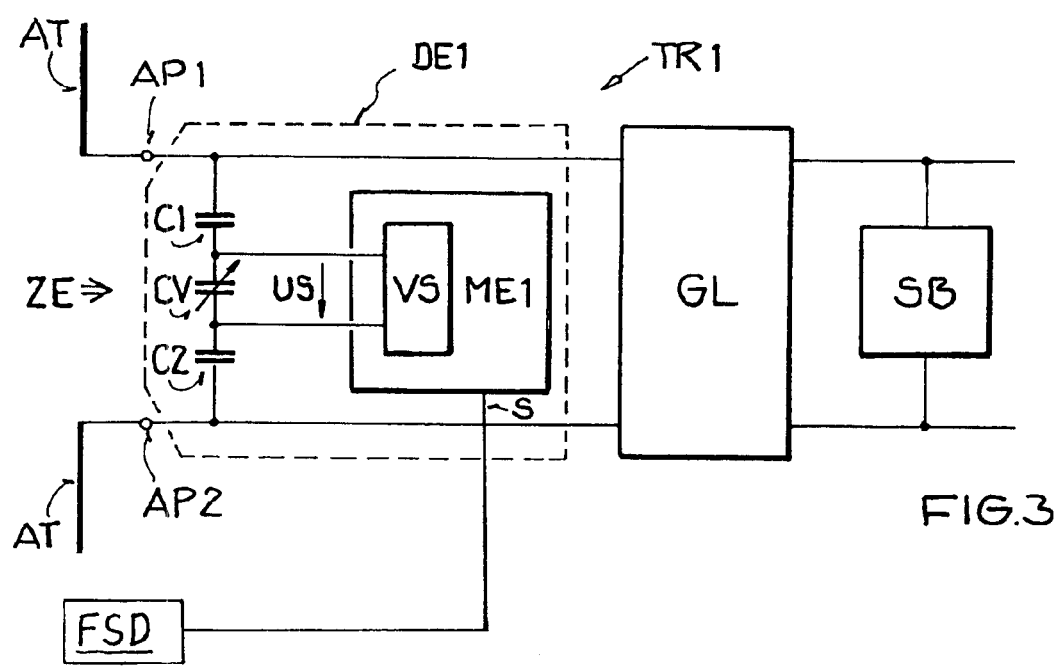
FIG. 3 is a schematic block circuit diagram of a circuit arrangement for deriving electrical power from an electromagnetic field, integrated in a passive transponder, including a varactor and a varactor control device that controls the varactor in a field strength dependent manner.

FIG. 3 is a schematic block circuit diagram of an alternative circuit arrangement for providing or deriving electrical power from an electromagnetic field, integrated into a passive transponder TR1. The circuit arrangement of FIG. 3 includes many components the same as those shown and described in connection with FIG. 1, whereby these same components bear the same reference numbers and will not be redundantly described here. In comparison to the embodiment of FIG. 1, the circuit arrangement of FIG. 3 has a different alternative detuning unit DE1, comprising a first capacitor C1, a varactor CV and a second capacitor C2 connected in series between the antenna connection terminals AP1 and AP2. The alternative detuning unit DE1 further comprises a PSK modulation arrangement or modulator ME1 including a varactor control device VS preferably comprising a controllable voltage source connected to opposite sides of the varactor CV.

The PSK modulator ME1 generates a phase modulated output signal from the input signal for carrying out the data transmission to the base station. The phase modulated output signal is emitted and particularly reflected or backscattered from the antenna AT as a backscatter signal that can be received by the base station. Thereby, the phase modulation is carried out dependent on and in accordance with the data to be transmitted to the base station. For generating different phase positions by changing the input impedance ZE, the controllable voltage source VS of the modulator ME1 applies a variable control voltage US to the varactor CV in order to vary the capacitance of the varactor CV. In this context, the control voltage US is varied dependent on the data to be transmitted, so as to correspondingly vary the capacitance of the varactor CV, and thereby correspondingly vary the input impedance of the circuit arrangement, to cause the corresponding modulation of the backscattering of the electromagnetic wave.

A circuit arrangement for carrying out such a modulation method as described above in connection with FIG. 3 is, for example, the subject matter of the earlier German patent application DE 101 58 442.3 (published Jun. 26, 2003) of the same assignee as the present application, as well as the counterpart U.S. published application Ser. No. 2003/0102961 A1 (published Jun. 5, 2003), the disclosure of which is incorporated herein by reference.

In addition to carrying out the data transmission by varying the capacitance of the varactor CV and thus the overall input impedance ZE for modulating the backscattered signal, the varactor control means VS further control the varactor CV dependent on the field strength of the electromagnetic field acting on or prevailing in the general location of the antenna AT. In this regard, a field strength information S regarding the field strength at the antenna AT is provided to the modulator ME1 from a field strength detection and control unit FSD, which suitably detects the field strength and provides the corresponding field strength signal S. In this regard, the field strength detection and control unit FSD can comprise any conventionally known detector, sensor and/or circuit arrangement for detecting the field strength of the electromagnetic field and providing a corresponding signal S.

Dependent on and in accordance with the field strength information signal S, the modulator ME1 controls and adjusts the controllable voltage source VS to correspondingly control the voltage US applied to the varactor CV to vary the capacitance of the varactor CV and thereby vary the impedance ZE in order to achieve the above discussed mis-matching or detuning through an operating point adjustment of the PSK modulator. In comparison to the circuit arrangement of FIG. 1, thus, the capacitance of the varactor does not adjust or change itself "automatically" directly dependent on the field strength, but instead is adjusted actively by the varactor control means VS dependent on and in accordance with the field strength that is detected by the field strength detector FSD.

In the illustrated embodiment, the modulation arrangement ME1 is represented as being integrated into the detuning unit DE1. In actual practice, the modulation arrangement ME1 can either be integrated into the detuning unit DE1 or realized and arranged separately therefrom. In either case, the modulation unit ME1 participates in the detuning adjustment in the manner discussed above.

The illustrated circuit arrangements enable the reliable and interference-free operation of a transponder both in the near field and in the far field region of the electromagnetic waves emitted from the base station, whereby a large transmission range and a great security against interference can be achieved especially due to the PSK modulation used in the transponder. Furthermore, as mentioned above, the inventive circuit arrangement can also be incorporated in other wireless power-supplied components or circuits instead of the illustrated transponder, for example in a remote sensor, which is also considered to be covered by the general term "transponder" herein.

The inventive circuit arrangement and method also apply to semi-passive applications in which only a portion of the power required by the component or circuit arrangement is derived in a wireless manner from the electromagnetic field received by the antenna, while the rest of the power requirements are covered in another manner, for example being supplied by a battery or some other power supply connection.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A circuit arrangement for deriving electrical power from a high frequency electromagnetic field, comprising:
   an antenna that is adapted to receive the electromagnetic field and that has two antenna connection terminals; and
   a detuning unit that is connected between said two antenna connection terminals and that is adapted to limit an electrical power absorbed by said antenna from the electromagnetic field;
   wherein said detuning unit comprises at least one circuit component having a variable impedance characteristic of an impedance that is adapted to vary dependent on and responsive to a field strength of the electromagnetic field prevailing at said antenna.

2. The circuit arrangement according to claim 1, adapted and designed to operate with the electromagnetic field having a frequency in a range from 300 MHz to 3000 MHz.

3. The circuit arrangement according to claim 1, adapted and designed to operate with the electromagnetic field having a frequency in a range from 400 MHz to 2450 MHz.

4. The circuit arrangement according to claim 1, wherein said variable impedance characteristic of said circuit component comprises predominantly a variation of an imaginary part of said impedance.

5. The circuit arrangement according to claim 1, wherein said circuit component comprises a varactor diode or varactor.

6. The circuit arrangement according to claim 5, wherein said detuning unit further comprises a varactor control device connected to, and adapted to control, said varactor diode or said varactor dependent on and responsive to the field strength.

7. The circuit arrangement according to claim 1, wherein said at least one circuit component of said detuning unit comprises two varactor diodes that are connected antiparallel to each other between said two antenna connection terminals.

8. The circuit arrangement according to claim 7, wherein said two varactor diodes each respectively have a voltage-dependent capacitance that varies dependent on a voltage prevailing at said two antenna connection terminals, which relates to the field strength of the electromagnetic field prevailing at said antenna, and wherein said voltage-dependent capacitance varies in a range of said voltage arising in normal interference-free operation of said circuit arrangement with said antenna receiving the electromagnetic field.

9. The circuit arrangement according to claim 1, wherein said at least one circuit component comprises, in order, a first capacitor, a varactor, and a second capacitor connected in series between said two antenna connection terminals, and said detuning unit further comprises a varactor control device connected to said varactor and adapted to apply a field strength dependent control voltage to said varactor.

10. The circuit arrangement according to claim 9, wherein said varactor control device comprises a controllable voltage source.

11. The circuit arrangement according to claim 10, further comprising a field strength detector that is adapted to detect the field strength of the electromagnetic field and that has a field strength signal output connected to a control input of said varactor control device.

12. The circuit arrangement according to claim 1, further comprising a rectifier with an input side connected to said two antenna connection terminals and with a rectifier output side, and a voltage limiter circuit connected to said rectifier output side.

13. The circuit arrangement according to claim 1, integrated in a passive transponder.

14. The circuit arrangement according to claim 13, wherein said transponder further comprises a modulator that is connected to said two antenna connection terminals and that is adapted to modulate and backscatter from said antenna electromagnetic waves of said electromagnetic field received by said antenna, wherein the modulator is adapted to perform a modulation that is dependent on data that are to be transmitted.

15. The circuit arrangement according to claim 14, wherein said modulator is a phase shift keying modulator adapted to carry out the modulation as phase shift keying modulation.

16. The circuit arrangement according to claim 1, wherein said detuning unit does not include an amplitude shift keying modulator.

17. A receiving/backscattering device adapted to receive, modulate and backscatter an electromagnetic field, comprising:
   an antenna that is arranged to receive the electromagnetic field and that has two antenna connection terminals;
   a modulator connected directly or indirectly to said two antenna connection terminals and adapted to vary a reflection characteristic of said antenna so as to form a modulated backscattered signal from the electromagnetic field received by said antenna;
   a rectifier having an input side connected to said two antenna connection terminals and an output side adapted to provide rectified power for operating said device; and
   a variable-impedance arrangement that is connected directly or indirectly between said two antenna connection terminals, and that exhibits a variable impedance adapted to vary dependent on a field strength of the electromagnetic field thereby varying a degree of power coupling from the electromagnetic field through said antenna to said input side of said rectifier dependent on the field strength of the electromagnetic field.

18. The receiving/backscattering device according to claim 17, wherein said variable impedance arrangement comprises two varactor diodes connected parallel to each other in respective opposite forward conduction directions directly between said two antenna connection terminals.

19. The receiving/backscattering device according to claim 18, wherein said two varactor diodes each respectively have a voltage-dependent capacitance that varies dependent on a voltage prevailing at said two antenna connection terminals, which relates to the field strength of the electromagnetic field prevailing at said antenna, and wherein said voltage-dependent capacitance varies in a range of said voltage arising in normal interference-free operation of said device with said antenna receiving the electromagnetic field.

20. The receiving/backscattering device according to claim 17,
   further comprising a series circuit including a first capacitor and a second capacitor connected in series between said two antenna connection terminals,
   wherein said variable impedance arrangement comprises a varactor connected in series between said first and second capacitors and thereby connected indirectly between said two antenna connection terminals, a controllable voltage source having a control input and having a controlled variable voltage output connected to opposite sides of said varactor between said first and second capacitors, and a field strength detector that is arranged and adapted to detect the field strength of the electromagnetic field and that has a field strength dependent signal output connected to said control input of said controllable voltage source.

21. The receiving/backscattering device according to claim 20, wherein said modulator is also connected via said controllable voltage source to said opposite sides of said varactor and is thereby connected indirectly to said two antenna connection terminals.

22. A method of deriving electrical power from an electromagnetic field for operating a receiving/backscattering device including an antenna, comprising:
   a) receiving said electromagnetic field with said antenna, and coupling electrical power from said electromagnetic field via said antenna into said device;

b) rectifying said electrical power to provide rectified electrical power for consumption in said device; and c) varying an input impedance of said device by varying predominantly an imaginary part of said input impedance so as to vary an amount of said electrical power being coupled into said device dependent on and responsive to a field strength of said electromagnetic field.

23. The method according to claim 22, wherein said varying of said input impedance does not involve amplitude modulation.

24. The method according to claim 22, wherein said varying of said input impedance comprises varying the capacitance of at least one varactor diode having a voltage-dependent variable capacitance connected between two terminals of said antenna, wherein a voltage prevailing on said two terminals is dependent on the field strength of the electromagnetic field.

25. The method according to claim 22, wherein said varying of said input impedance comprises detecting the field strength of the electromagnetic field, and applying to a varactor connected between two terminals of said antenna a variable voltage that is actively varied and controlled dependent on the field strength that has been detected.

26. The method according to claim 22, wherein said varying of said input impedance involves providing an increased degree of impedance matching of said input impedance when said field strength is relatively lower and providing a decreased degree of impedance matching of said input impedance when said field strength is relatively higher.

* * * * *